(12) United States Patent
Hasberg et al.

(10) Patent No.: US 12,716,730 B2
(45) Date of Patent: Aug. 25, 2026

(54) METHOD FOR PREDICTING THE AVAILABILITY OF A FEATURE-BASED LOCALIZATION OF A VEHICLE, AND METHOD FOR CONTROLLING A VEHICLE

(71) Applicant: Robert Bosch GmbH, Stuttgart (DE)

(72) Inventors: Carsten Hasberg, Ilsfeld-Auenstein (DE); Georg Krause, Ludwigsburg (DE)

(73) Assignee: ROBERT BOSCH GMBH, Stuttgart (DE)

( * ) Notice: Subject to any disclaimer, the term of this patent is extended or adjusted under 35 U.S.C. 154(b) by 29 days.

(21) Appl. No.: 18/844,138

(22) PCT Filed: Mar. 6, 2023

(86) PCT No.: PCT/EP2023/055562
§ 371 (c)(1),
(2) Date: Sep. 5, 2024

(87) PCT Pub. No.: WO2023/186457
PCT Pub. Date: Oct. 5, 2023

(65) Prior Publication Data

US 2025/0172399 A1 May 29, 2025

(30) Foreign Application Priority Data

Apr. 1, 2022 (DE) ..................... 10 2022 203 261.6

(51) Int. Cl.
*G01C 21/34* (2006.01)
*G01C 21/00* (2006.01)

(52) U.S. Cl.
CPC ......... *G01C 21/34* (2013.01); *G01C 21/3841* (2020.08); *G01C 21/3896* (2020.08)

(58) Field of Classification Search
CPC ........................... G01C 21/34; G01C 21/3841; G01C 21/3896; G01C 21/3453; G01C 21/3815

(Continued)

(56) References Cited

U.S. PATENT DOCUMENTS

2017/0322040 A1* 11/2017 Stephens ............ G01C 21/3453
2021/0080272 A1* 3/2021 Zhou .................... G01C 21/343

(Continued)

FOREIGN PATENT DOCUMENTS

DE 102011084993 A1 4/2013
DE 102014201158 A1 7/2015

(Continued)

OTHER PUBLICATIONS

International Search Report for PCT/EP2023/055562, Issued Jun. 23, 2023.

*Primary Examiner* — Hitesh Patel
*Assistant Examiner* — John D Holman
(74) *Attorney, Agent, or Firm* — NORTON ROSE FULBRIGHT US LLP

(57) ABSTRACT

A method for predicting the availability of feature-based localization of a vehicle. The method includes: receiving map data from a feature map of a road traffic network; ascertaining, on the basis of the feature information from the feature map, features for at least one roadway to be used by the vehicle; calculating an availability value for the features of the at least one roadway to be used by the vehicle with respect to an availability criterion; and outputting availability information that includes the availability value and relates to the features of the roadway to be used.

13 Claims, 3 Drawing Sheets

(58) Field of Classification Search
USPC .............................................................. 701/25
See application file for complete search history.

(56) References Cited

U.S. PATENT DOCUMENTS

| | | | | |
|---|---|---|---|---|
| 2021/0381845 | A1* | 12/2021 | Gokhale | G01C 21/3691 |
| 2022/0178717 | A1* | 6/2022 | Kume | G01C 21/30 |

FOREIGN PATENT DOCUMENTS

| | | | |
|---|---|---|---|
| DE | 102017109400 | A1 | 11/2017 |
| DE | 102017201663 | A1 | 8/2018 |
| DE | 102017211556 | A1 | 1/2019 |
| EP | 3907720 | A1 | 11/2021 |
| JP | 2019039826 | A | 3/2019 |

* cited by examiner

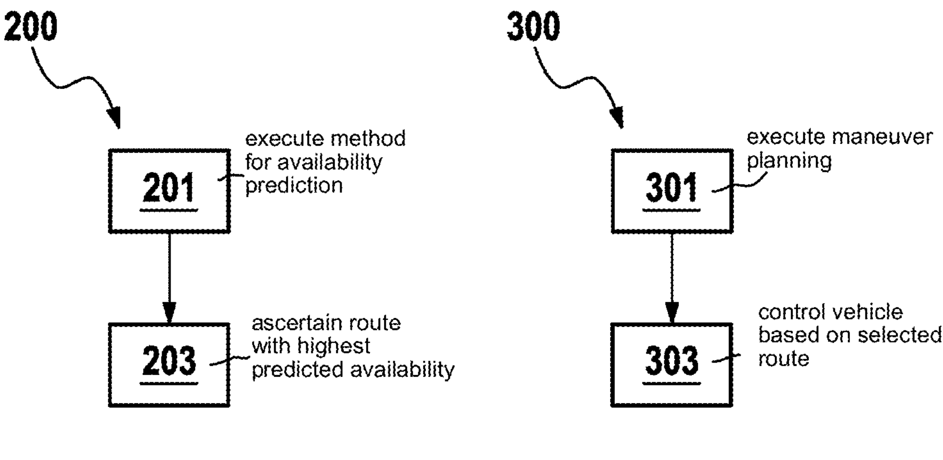
FIG. 3
FIG. 4
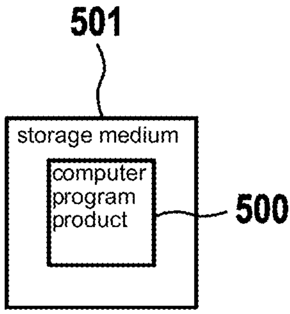
FIG. 5

METHOD FOR PREDICTING THE AVAILABILITY OF A FEATURE-BASED LOCALIZATION OF A VEHICLE, AND METHOD FOR CONTROLLING A VEHICLE

FIELD

The present invention relates to a method for predicting the availability of a feature-based localization of a vehicle. The present invention further relates to a method for route planning for an autonomously controllable vehicle. The present invention further relates to a method for controlling a vehicle.

BACKGROUND INFORMATION

Automated and highly automated driving are seen as trends of the future. For the orientation of autonomously controllable vehicles, map representations of a surrounding area of the vehicle are of utmost importance. Localization of the vehicles is achieved in particular by comparison with features of corresponding feature maps and objects arranged in the surrounding area of the vehicles that are detected by the environmental sensors. If such localization is not possible because corresponding objects are not detected by the environmental sensors while driving, autonomous control cannot be implemented. For the autonomous control of a vehicle, it is therefore crucial to select routes in which reliable detection of a sufficient number of objects can be expected for comparison with corresponding features of a feature map.

SUMMARY

It is an object of the present invention to provide an improved method for predicting the availability of a feature-based localization of a vehicle, an improved method for route planning for an autonomously controllable vehicle and an improved method for controlling a vehicle.

This object may be achieved by a method for predicting the availability of a feature-based localization of a vehicle, a method for route planning for an autonomously controllable vehicle, and a method for controlling a vehicle, according to the present invention. Advantageous example embodiments of the present invention are disclosed herein.

According to one aspect of the present invention, a method for predicting the availability of a feature-based localization of a vehicle is provided. According to an example embodiment of the present invention, the method includes:

receiving map data from a feature map of a road traffic network, wherein the feature map comprises feature information of a plurality of roadways that can be used by a vehicle, and wherein the features are configured to be detected by a vehicle using the roadway, via sensor data from environmental sensors of the vehicle, and to be used for a localization of the vehicle;

ascertaining, on the basis of the feature information from the feature map, features for at least one roadway to be used by the vehicle;

calculating an availability value for the features of the at least one roadway to be used by the vehicle with respect to an availability criterion, wherein the availability value indicates a quantitative measure for a usability of the features for the localization of the vehicle when the vehicle is using the roadway; and outputting availability information that comprises the availability value and relates to the features of the roadway to be used.

This can achieve a technical advantage that an improved method for predicting the availability of a feature-based localization of a vehicle can be provided. The method according to the present invention is in particular used for route planning for vehicles, for example autonomously controllable vehicles. For a route to be used by a vehicle, features of a feature map are ascertained for the respective roadways of the route and availability values are calculated for the respective features. Here, the availability values describe a quantitative measure of the usability of the features for a localization of the vehicle when using the roadways of the selected route. Here, features of the feature map can be used for the localization of the vehicle if the respective features can be detected via environmental sensors of the vehicle when the vehicle is using the relevant roadway of the selected route. Here, features of the feature map correspond to corresponding objects within the surrounding area. The objects can be arranged along the relevant roadway to be used by the vehicle. The objects can, for example, be arranged at the edge of the roadway to be used. However, depending on the position of the vehicle on the roadway, the type of environmental sensors or conditions of the surrounding area, such as weather conditions or traffic volume, not all objects can be seen by the environmental sensors of the vehicle at any point in time or every time the vehicle is using the roadway and are thus not available for determining the position of the vehicle. After calculating the availability values for the plurality of features of the various roadways, corresponding availability information with respect to the features of the roadways to be used is output. By means of the output availability information, a corresponding route selection can be made based on the availability of the features or objects arranged along the individual roadways of the selected route. For example, based on the availability information in a route plan, the driver can be provided with a route with the highest availability of the features in addition to a route with the shortest travel time. Here, the availability describes a value, for example a percentage or a probability value, which indicates how many of the objects can be viewed or with what probability a detection of the objects can be expected.

According to one example embodiment of the present invention, the availability criterion comprises a detectability of the features by the environmental sensors of the vehicle based on a sensor type and/or a directional characteristic of the environmental sensors of the vehicle, wherein the calculation of the availability value comprises:

ascertaining a sensor type and/or a directional characteristic of at least one environmental sensor of the vehicle; and determining the detectability of the features of the roadway to be used by the vehicle for the sensor type and/or the directional characteristic of the at least one environmental sensor.

This can achieve a technical advantage that a precise calculation of the availability of the features stored in the feature map for localization of a vehicle can be achieved. For this purpose, the availability criterion taken into account for calculating the availability value is defined as a detectability of the features by the environmental sensors of roadway to be used by the vehicle, based on a sensor type and/or a directional characteristic of the environmental sensors of the vehicle. Here, the sensor type of the environmental sensors can comprise the design of the environmental sensors as camera sensors, radar sensors or LIDAR sensors.

According to the present invention, the directional characteristic is to be understood as a corresponding direction-dependent sensitivity of the relevant environmental sensor. Based on the sensor type and the directional characteristic, the detectability of the features arranged along the roadway to be used by the vehicle can be calculated for each environmental sensor of the vehicle. Thus, the detectability of a feature by the relevant environmental sensor can depend on the position of the feature relative to the vehicle, in that the relevant feature is completely, partially or not at all captured by the directional characteristic of the relevant environmental sensor. Likewise, the detectability of a feature can be determined by the relevant nature of the feature, in that depending on the reflectivity of the feature, the feature can be detected well, poorly or not at all by environmental sensors of different types. For example, objects that can be easily detected by a radar sensor can hardly be detected by a camera sensor, for example at night and in insufficient lighting, and thus cannot be used for localization of the vehicle.

According to one example embodiment of the present invention, the availability criterion comprises a detectability of the features by the environmental sensors of the vehicle, taking into account a traffic volume on the roadway to be used, wherein the calculation of the availability value comprises: ascertaining the traffic volume on roadway to be used by the vehicle; and determining the detectability of the features of the roadway to be used by the vehicle by calculating a coverage of the features of the roadway by the traffic volume on the roadway.

This can achieve a technical advantage that a further improvement of the calculation of the availability information of the individual features of the feature map can be achieved. For this purpose, the availability criterion also calculates the detectability of the features by the environmental sensors of the vehicle, taking into account a traffic volume on the roadway to be used by the vehicle. Since the individual features are usually arranged along the roadway to be used by the vehicle, a detectability of the features by the environmental sensors of the vehicle can be significantly impaired not only by the properties of the respective environmental sensors, but also by the other vehicles of the road traffic that are arranged in the surrounding area of the vehicle. In the case of a high traffic volume, in which a correspondingly high number of other vehicles are arranged in the surrounding area of the vehicle, which each hinder a detection of the features arranged at the edge of the roadway by the environmental sensors of the vehicle, there is a correspondingly low availability of the features of the relevant roadway, since they cannot be detected or recorded by the environmental sensors due to the blocking by other vehicles.

According to one example embodiment of the present invention, ascertaining the traffic volume comprises:

determining an average number and/or an average speed of vehicles per unit of time on the roadway to be used by the vehicle; and wherein determining the detectability comprises:

calculating an average coverage of the features of the roadway based on the average number and/or speed of vehicles per unit of time.

This can achieve a technical advantage that a precise prediction of the traffic volume for the relevant roadway to be used by the vehicle is made. This in turn contributes to an improved determination of the availability information with respect to the relevant roadway. Since the method according to the present invention is primarily intended for route planning, in order to determine the availability of the features of a roadway to be used in the future by the relevant vehicle, a traffic volume that will probably prevail on the relevant roadway at the point in time of the use of the roadway by the vehicle on the relevant roadway must be predicted. By calculating the average traffic volume and, on the basis thereof, the average coverage of the features by the vehicles in the traffic volume, a precise and probable prediction of a traffic volume to be encountered for any point in time in the future can thus be achieved. Here, the average traffic volume can be calculated based on an average number or average speed of vehicles on the relevant roadway.

According to one example embodiment of the present invention, calculating the availability value comprises:

determining at least one characteristic of the features, wherein the at least one characteristic comprises: type of feature, number of features, number of features of a specific type or category, extension and/or size of the features, reflectivity of the features; recognition value of the features, and wherein determining detectability takes place in relation to the at least one specific characteristic of the features and a detectability-corrected characteristic is calculated.

This can achieve a technical advantage that a further refinement of the calculation of the availability value or availability information can be achieved. The detectability of the plurality of features of the relevant roadway can be further quantified using the various characteristics of the features, such as the type of feature, the number of features or the spatial extension of the features. Here, the characteristics can be extracted from the detected features in particular by executing a correspondingly trained artificial intelligence. According to the present invention, the characteristics are in particular statistical quantities that describe the set of features in its entirety.

According to one example embodiment of the present invention, calculating the availability value comprises:

comparing the at least one characteristic of the features of the map representation with the corresponding detectability-corrected characteristic.

This can achieve a technical advantage that a further refinement of the calculation of the availability value is made possible.

For this purpose, a comparison of characteristics of the features of the feature map with a correspondingly detectability-corrected characteristic of the features is carried out. For this purpose, for example, the number of features within the feature map can be compared with or set in relation to the number of features predicted for a specific traffic volume and correspondingly reduced. Due to the traffic volume and the other vehicles in each case arranged in the surrounding area of the vehicle, not all features of the roadway can be detected by the vehicle. By comparing the features of the feature map with the number of features that can be detected by the environmental sensors of the vehicle, calculated for the relevant traffic volume, a quantitative value for the availability of the respective features of the feature map can thus be calculated.

According to one example embodiment of the present invention, determining detectability is carried out for at least one previously known position of the vehicle on the roadway or for different previously known positions of the vehicle on different lanes of the roadway.

This can achieve a technical advantage that a position-dependent detectability of the features of the relevant roadway to be used in each case can be determined. By taking the position into account, a further refinement in the determination of the availability of the features of the feature map can be achieved. Taking into account different lanes of the roadway to be used further provides additional refinement of the availability determination.

According to one example embodiment of the present invention, determining detectability is executed by a correspondingly trained artificial intelligence, wherein the artificial intelligence is trained on environmental sensor data from environmental sensors of at least one vehicle, and wherein the environmental sensor data were recorded during a plurality of journeys of the vehicle along the at least one roadway during a plurality of different traffic volumes.

This can achieve a technical advantage that a precise, fast and reliable determination of detectability is made possible.

According to one example embodiment of the present invention, the features are characteristic objects arranged at an edge of the roadway and comprise: buildings, traffic signs, roadway markings.

This can achieve a technical advantage that it is possible to take various features into account comprehensively. In particular, the characteristic objects are all objects suitable for localization and detectable by radar, lidar, ultrasound and video and can comprise directional arrows, lane markings, in particular broken lines, trees, other vegetation, bridges, distributed structures such as poles and posts; elements for delimiting the roadway: paving stones, crash barriers and bollards. The list here is not to be understood as exhaustive.

In addition, features can be detected and used that cannot be named semantically, but can be extracted from the raw data of the environmental sensors by correspondingly trained artificial intelligence. The artificial intelligence usually recognizes or detects key points in the environmental sensor data and assigns a vector thereto that describes the type of point. These key points, which are not known to the operator of the artificial intelligence and cannot be described semantically, but which are nevertheless reliably detected by the corresponding artificial intelligence, can also be used as characteristic objects within the meaning of the present invention.

According to a further aspect of the present invention, a method for route planning for an autonomously controllable vehicle is provided. According to an example embodiment of the present invention, the method includes:

- executing the method for predicting the availability of a feature-based localization of a vehicle according to one of the above-described embodiments of the present invention on a plurality of possible routes of the vehicle between a predetermined starting point and a predetermined end point; and ascertaining a route of the vehicle with a highest predicted availability of a feature-based localization of the vehicle based on the availability prediction executed.

This can provide a technical advantage of improved route planning for an autonomously controllable vehicle, in which in addition to a fastest route, a route can be provided on which a highest availability of the features required for positioning is to be expected, and on which fully autonomous control of the vehicle is thus possible with the highest probability.

According to a further aspect of the present invention, a method for controlling a vehicle is provided. According to an example embodiment of the present invention, the method includes: executing the method for route planning for an autonomously controllable vehicle according to the present invention; and controlling the vehicle based on the selected route.

This can achieve a technical advantage of improved control of an autonomously controllable vehicle, wherein the control system makes use of the improved route planning and the improved availability prediction with the technical advantages mentioned above.

According to one example embodiment of the present invention, controlling the vehicle comprises executing maneuver planning, wherein the maneuver planning comprises a driving maneuver of the vehicle that makes optimal availability of the features of the features of the feature map possible.

This can achieve a technical advantage of improved control of the vehicle. In particular, based on the results of the availability determination, the vehicle can execute a driving maneuver that optimizes the availability. For example, the driving maneuver can involve changing a lane of the roadway to be used if a difference in the availability of features for different lanes of the road has been ascertained.

According to a further aspect of the present invention, a computing unit is provided, which is configured to execute the method for predicting the availability of a feature-based localization of a vehicle according to one of the above-described embodiments and/or the method for route planning for an autonomously controllable vehicle and/or the method for controlling a vehicle, of the present invention.

According to a further aspect of the present invention, a computer program product comprising instructions is provided, which, when the program is executed by a data processing unit, cause the data processing unit to execute the method for predicting the availability of a feature-based localization of a vehicle according to one of the preceding embodiments and/or the method for route planning for an autonomously controllable vehicle and/or the method for controlling a vehicle, according to the present invention.

Exemplary embodiments of the present invention are explained with reference to the figures.

BRIEF DESCRIPTION OF THE DRAWINGS

FIG. 3 is a flow chart of a method for route planning for an autonomously controllable vehicle according to one example embodiment of the present invention.

FIG. 4 is a flow chart of a method of controlling a vehicle according to one example embodiment of the present invention.

FIG. 5 is a schematic representation of a computer program product for executing the method for predicting the availability of a feature-based localization of a vehicle and/or the method for route planning for an autonomously controllable vehicle and/or the method for controlling a vehicle.

DETAILED DESCRIPTION OF EXAMPLE EMBODIMENTS

Figure 1:
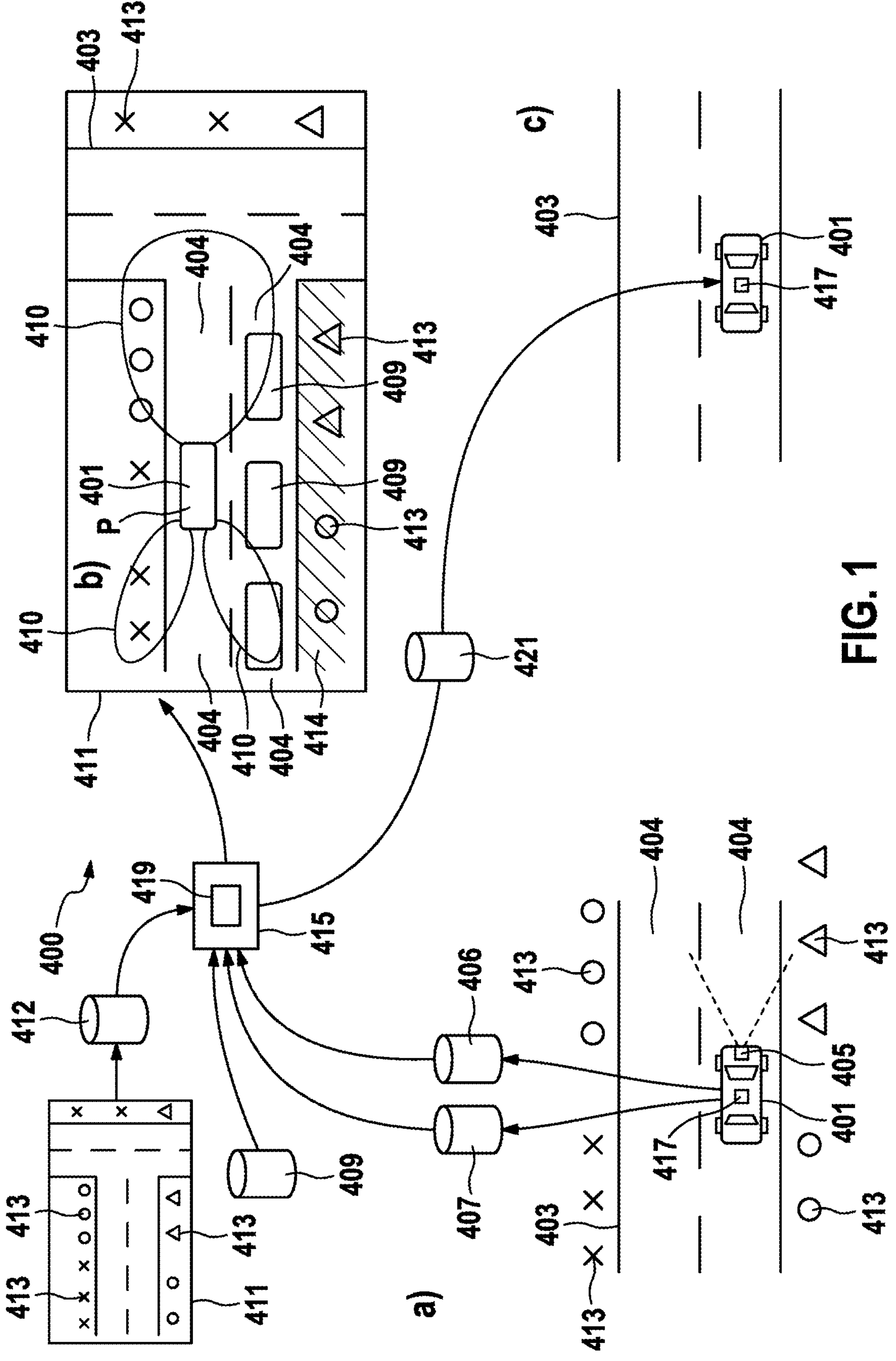
FIG. 1 is a schematic representation of a system for controlling a vehicle, according to an example embodiment of the present invention.

FIG. 1 is a schematic representation of a system 400 for controlling a vehicle 401.

Graphic a) of FIG. 1 shows a vehicle 401 that is traveling on a roadway 403. Various features 413 are arranged along the roadway 403. The features 413 are designed as various objects, for example buildings, vegetation, traffic signs or the like, by means of which an orientation of the vehicle 401 is made possible. Graphic a) also shows a feature map 413. In the feature map 413, the shown roadway 403 is shown with the correspondingly arranged features 413. Graphic a) also shows a computing unit 415 with an installed artificial intelligence 419. Here, the computing unit 415 is designed to execute the method according to the present invention for predicting the availability of a feature-based localization of a vehicle 401.

The vehicle 401 further comprises at least one environmental sensor 405, by means of which a recognition of a surrounding area of the vehicle 401 is made possible. The vehicle 401 also comprises a computing unit 417. The computing unit 417 can, for example, be designed for autonomous control or partially automated control of the vehicle.

The computing unit 415 can, for example, be designed as an external server unit or as an external cloud server.

In order to execute the method according to the present invention for predicting the availability of a feature-based localization of a vehicle 401, the computing unit 415 initially receives the feature map 411 in the form of corresponding map data 412. Furthermore, the computing unit 415 is provided with sensor information data 407 from the environmental sensors 405 of the vehicle 401. The sensor information data 407 can, for example, comprise information with respect to the sensor type of the environmental sensors or a directional characteristic of the respective environmental sensors 405 of the vehicle 401. Furthermore, data of a traffic volume 409 with respect to a roadway 403 can be provided to the computing unit 415. The data of the traffic volume 409 can be current data of a traffic volume on a specific roadway or a plurality of different roadways at a given point in time. Alternatively, the data can refer to past points in time. Alternatively, the data can describe average traffic volumes. The data 409 can, for example, be transmitted by other vehicles that were using the relevant roadway at the predefined point in time. Alternatively, the data 409 can be archived data. The data 409 can further comprise the number and/or speeds of the vehicles.

In order to calculate the availability prediction of a feature-based localization of a vehicle 401, the computing unit 415 calculates an availability value for a roadway 403 to be used by a vehicle 401 based on the map data 412 of the feature map 411 for the features 413 arranged along the roadway 403, taking into account an availability criterion.

According to one embodiment, a detectability of the features 413 by the environmental sensors 405 of the relevant vehicle 401 can be taken into account for the availability criterion of the individual features 413. For this purpose, the information of the sensor information data 407 with respect to the sensor type and/or the directional characteristic 410 of the individual environmental sensors 405 can be taken into account. Based on the feature information of the feature map 411, a corresponding detectability of the relevant feature 413 by the environmental sensors 405 can thus be calculated for each feature 413 of the feature map 411 that is arranged along the roadway 403 to be used by the vehicle 401, according to the relevant sensor type or directional characteristic 410 of the respective environmental sensors 405 of the vehicle 401. Here, detectability describes a quantifiable size according to which the respective features 413 can be detected by the environmental sensors 405 of the vehicle 401. This detectability may depend, for example, on the nature of the relevant feature 413 and/or the nature of the environmental sensors. For example, features 413 may comprise advantageous reflectivity for LIDAR or radar sensors, but may be difficult to recognize for camera sensors, for example due to low ambient light.

Alternatively or additionally, the detectability of the features 413 can be calculated taking into account the expected traffic volume on the relevant roadway 403. Based on corresponding data 409 of the current or average traffic volume that is to be expected on the relevant roadway 403, the traffic volume for the point in time at which the vehicle 401 will use the corresponding roadway 403 can be calculated. For the calculation, for example, an average speed or an average number of vehicles that are to be expected on the roadway 403 at the future point in time can be used to calculate an average coverage. Here, the average coverage describes a coverage of the features 413 arranged at the edge of the roadway 403 by the other vehicles arranged on average in the surrounding area of the vehicle 401 when using the roadway 403, due to the traffic volume.

In graphic b), such a calculation of the detectability of the individual features 413 for the environmental sensors 405 of a vehicle 401 using the roadway 403 is graphically shown. In the representation shown, the vehicle 401 is arranged on the left-hand lane 404 of the roadway 403. Furthermore, three further vehicles of the expected traffic volume 409 are shown on the right-hand lane 404 of the roadway 403. Furthermore, graphic b) shows three directional characteristics 410 of three different environmental sensors 405 of the vehicle 401. Here, one directional characteristic 410 is directed toward the front region of the vehicle 401, while the two other directional characteristics 410 are directed toward the rear region of the vehicle 401. In the representation shown, the features 413 arranged on the right-hand edge of the roadway 403 are covered by the other vehicles in the traffic volume 409 for the environmental sensors 405 of the vehicle 401. This is shown in graphic b) by an average coverage 414. The average coverage 414 can, for example, be indicated as a percentage. Of the six features 413 arranged on the left-hand edge of the roadway 403, in the representation shown, only five features 413 are in the ranges of the directional characteristics 410. Thus, the feature 413 not covered by the directional characteristics 410 cannot be detected by the vehicle 401 in the position P shown. According to the present invention, the availability of the features 413 of the feature map 411 can be calculated depending on the position for different positions P of the vehicle 401 on the roadway 403. In graphic b), for the position P of the vehicle 401, only five of the six features 413 on the left-hand edge of the roadway 403 can be detected by the environmental sensors 405 of the vehicle 401.

According to one embodiment, characteristics of the features can be determined to calculate the availability values of the various features 413. The characteristics can comprise, for example, the type of feature 413, the number of features 413 in the region of the roadway 403 to be used, spatial extensions or sizes of the features 413 or reflectivity of the features 413. In order to determine detectability, these characteristics of the features 413 can be taken into account by calculating corresponding detectability-corrected characteristics. In the example of the number of features 413 as a characteristic, the detectability-corrected number of features 413 can be calculated as the number of features 413 that can be detected by the environmental sensors 405 for the relevant sensor type or directional characteristic 410 of the environmental sensors 405 or for the calculated predicted traffic volume 409.

The availability value of the individual features 413 calculated in this way for a selected roadway 403 can thus be indicated, for example, as a percentage of the number of features 413 of the roadway 403. The corresponding availability information can thus indicate that for a relevant roadway 403, a certain percentage of the features 413 of the feature map 411 are available for localization of the vehicle 401.

For a corresponding route planning of a vehicle 401, the vehicle 401 or the driver can thus be provided with a route that comprises the highest availability of the features 413 of the calculated route, based on calculated availability information of the various roadways 403 of the relevant route, in addition to a calculated route with the shortest travel duration.

The corresponding route data 421 can be provided in the relevant vehicle 401 by the computing unit 415 designed as an external server unit.

The external server unit 415 can thus be configured to calculate an availability of the features 413 or objects arranged on the respective roadways for vehicles 401 and corresponding routes or roadways 403 to be used, and to ascertain corresponding routes with maximized availability of the features 413. This information can be provided to the vehicles 401 communicating with the external server unit 415.

In order to calculate a route, according to the present invention a data connection, for example in the form of a wireless data connection, can be established between a vehicle 401 and the computing unit 415 designed as an external server unit. Here, the sensor information data 407 of the environmental sensors 405 of the vehicle 401 can be transmitted to the computing unit 415. In addition to the data 409 with respect to the average traffic volume, the computing unit 415 or the external server unit can calculate a corresponding route with maximum availability according to the method according to the present invention for availability prediction and the method for route planning, and provide said route to the vehicle 401 via wireless communication.

Figure 2:
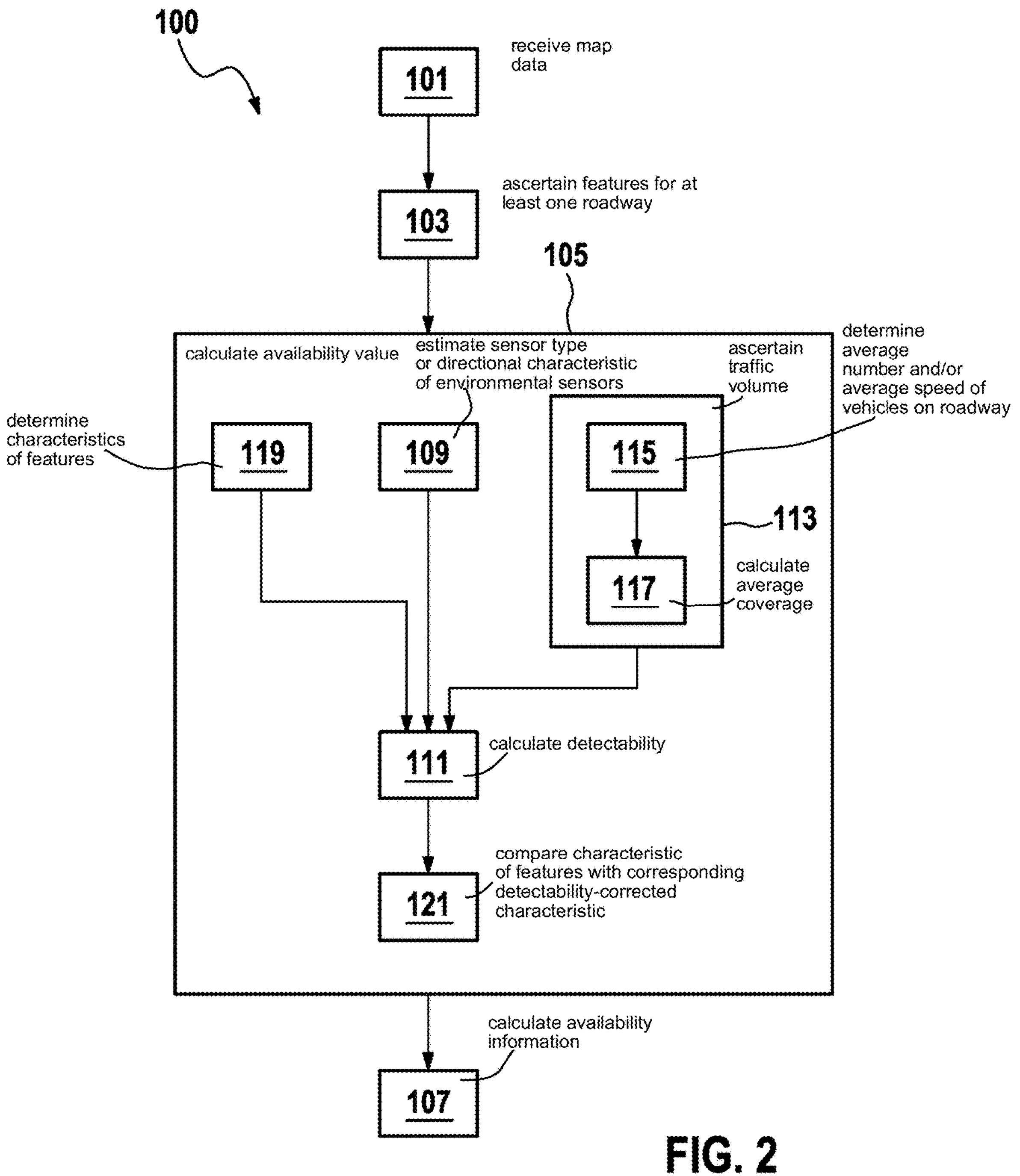
FIG. 2 is a flow chart of a method for predicting the availability of a feature-based localization of a vehicle according to an example embodiment of the present invention.

FIG. 2 is a flow chart of a method 100 for predicting the availability of a feature-based localization of a vehicle 401 according to one embodiment.

According to the present invention, in a first method step 101, map data 412 from a feature map 411 of a road traffic network are received, wherein the feature map 411 comprises feature information of a plurality of features 413 of a plurality of roadways 403 that can be used by a vehicle 401, and wherein the features 413 are configured to be detected by a vehicle 401 using the roadway 403, via sensor data 406 from environmental sensors 405 of the vehicle 401, and to be used for a localization of the vehicle 401.

In a further method step 103, features 413 for at least one roadway 403 to be used by the vehicle 401 are ascertained based on the feature information of the feature map 411.

In a further method step 105, an availability value of the features 413 of the at least one roadway 403 to be used by the vehicle 401 is calculated in relation to an availability criterion, wherein the availability value indicates a quantitative measure for a usability of the features 413 for the localization of the vehicle 401 when the vehicle 401 is using the roadway 403.

For this purpose, in the embodiment shown, a sensor type and/or a directional characteristic 410 of the environmental sensors 405 of the vehicle 401 are ascertained in a further method step 109.

Furthermore, in a further method step 113, a traffic volume is ascertained.

For this purpose, in a method step 115, an average number and/or an average speed of vehicles on the roadway 403 to be used by the vehicle is determined.

In a further method step 117, an average coverage 414 of the features 413 by the vehicles in the traffic volume is calculated based on the average number or average speed.

Furthermore, in a method step 119, characteristics of the features 413 are determined. The characteristics can comprise, for example, the number, properties or spatial extensions of the features.

In a method step 111, the detectability of the individual features by the environmental sensors 405 of the vehicle 401 is calculated based on the sensor type or directional characteristic and/or based on the calculated traffic volume or the average coverage.

In a further method step, at least one characteristic of the features 413 is compared with the detectability-corrected characteristic calculated in method step 119. Due to the comparison, an availability value in the form of a quantitative numerical value can be provided for the different characteristics. This can, for example, be indicated as a percentage.

In a further method step 107, availability information based on the availability value calculated in method step 105 is output with respect to the features 413 of the feature map 411 for the roadway 403 to be used by the vehicle 401.

FIG. 3 is a flow chart of a method 200 for route planning for an autonomously controllable vehicle 401 according to one embodiment.

According to the present invention, in a method step 201, the method 100 for availability prediction of a feature-based localization of a vehicle 401 is initially executed on a plurality of possible routes of the vehicle 401 between a predetermined starting point and a predetermined end point.

In a further method step 203, a route 421 of the vehicle 401 with a highest predicted availability of a feature-based localization of the vehicle 401 is ascertained based on the executed availability prediction.

According to one embodiment, controlling the vehicle 301 can comprise executing maneuver planning. Here, in particular, driving maneuvers can be planned and executed by the vehicle 301, which maneuvers increase the availability of the features of the feature map for the roadway to be used by the vehicle 301. For example, such a driving maneuver can comprise a change to a specific lane of the roadway to be used, wherein an increased availability of the feature is to be expected for the specific lane. Alternatively, controlling can comprise other driving maneuvers that can increase the availability of the features, for example a reduction in the planned speed or an activation of the vehicle headlights in order to be able to better view the objects arranged along the road to be used using the environmental sensors of the vehicle.

FIG. 4 is a flow chart of a method 300 for controlling a vehicle 401 according to one embodiment.

According to the present invention, in a method step 301, the method 200 for route planning for an autonomously controllable vehicle is initially carried out.

In a further method step 303, the vehicle 401 is controlled based on the selected route.

FIG. 3 is a schematic representation of a computer program product 500, comprising instructions that, when the program is executed by a computing unit, cause the latter to execute the method 100 for predicting the availability of a feature-based localization of a vehicle 401 and/or the method for route planning for an autonomously controllable vehicle 401 and/or the method for controlling a vehicle 401.

In the embodiment shown, the computer program product 500 is stored on a storage medium 501. In this case, the storage medium 501 can be any storage medium from the related art.

The invention claimed is:

1. A method for route planning for an autonomously controllable vehicle, the method comprising:

executing for predicting availability of a feature-based localization of the vehicle on each of a plurality of possible routes of the vehicle between a predetermined starting point and a predetermined end point, wherein at least one possible route of the plurality of possible routes includes at least one roadway having two or more traffic lanes with a shared direction of travel:

receiving map data from a feature map of a road traffic network, wherein the feature map includes feature information of a plurality of features of a plurality of roadways that can be used by the vehicle, and wherein the features are configured to be detected by the vehicle using the roadways, via sensor data from environmental sensors of the vehicle, and to be used for a localization of the vehicle;

ascertaining, based on the feature information from the feature map, features for at least one roadway to be used by the vehicle, wherein the at least one roadway to be used has two or more traffic lanes with a shared direction of travel;

calculating, for each respective traffic lane of the two or more traffic lanes of the at least one roadway to be used, an availability value for the features of the at least one roadway to be used by the vehicle with respect to an availability criterion, wherein the availability value indicates a quantitative measure for a usability of the features for the localization of the vehicle when the vehicle is using a respective traffic lane of the at least one roadway; and outputting availability information that includes the availability values and relates to the features of the at least one roadway to be used;

selecting a route of the vehicle with a highest predicted availability of a feature-based localization of the vehicle based on the executed availability prediction; and controlling the vehicle based on the selected route.

2. The method according to claim 1, wherein the availability criterion includes a detectability of the features by the environmental sensors of the vehicle, based on a sensor type and/or a directional characteristic of the environmental sensors of the vehicle, and wherein the calculation of the availability value includes:

ascertaining the sensor type and/or the directional characteristic of at least one environmental sensor of the vehicle; and determining the detectability of the features of the at least one roadway to be used by the vehicle for the sensor type and/or the directional characteristic of the at least one environmental sensor.

3. The method according to claim 1, wherein the availability criterion includes a detectability of the features by the environmental sensors of the vehicle, taking into account a traffic volume on the at least one roadway to be used, and wherein the calculation of the availability value includes:

ascertaining the traffic volume on the at least one roadway to be used by the vehicle; and determining the detectability of the features of the at least one roadway to be used by the vehicle by calculating a coverage of the features of the at least one roadway by the traffic volume on the at least one roadway.

4. The method according to claim 3, wherein the ascertaining of the traffic volume includes:

determining an average number and/or an average speed of vehicles per unit of time on the at least one roadway to be used by the vehicle; and wherein the determining of the detectability includes:

calculating an average coverage of the features of the at least one roadway based on the average number and/or speed of vehicles per unit of time.

5. The method according to claim 2, wherein:

the calculating of the availability value includes:

determining at least one characteristic of the features, wherein the at least one characteristic includes: type of feature, number of features, number of features of a specific type or category; recognition value of the features, extension and/or size of the features, reflectivity of the features; and the determining of the detectability takes place in relation to the at least one specific characteristic of the features and a detectability-corrected characteristic is calculated.

6. The method according to claim 5, wherein the calculating of the availability value includes:

comparing the at least one characteristic of the features of the feature map with a corresponding detectability-corrected characteristic.

7. The method according to claim 2, wherein the determining of the detectability is carried out for different previously known positions of the vehicle on different respective traffic lanes of the two or more traffic lanes of the at least one roadway.

8. The method according to claim 2, wherein the determining of the detectability is executed by a correspondingly trained artificial intelligence, wherein the artificial intelligence is trained on environmental sensor data from environmental sensors of at least one vehicle, and wherein the environmental sensor data were recorded during a plurality of journeys of the vehicle along the at least one roadway during a plurality of different traffic volumes.

9. The method according to claim 1, wherein the features are characteristic objects arranged at an edge of the at least one roadway and include at least one of:

buildings, traffic signs, roadway markings.

10. The method according to claim 1, wherein the controlling of the vehicle includes executing maneuver planning, wherein the maneuver planning includes a driving maneuver of the vehicle that makes optimal availability of the features of the features of the feature map possible.

11. The method according to claim 1, wherein controlling the vehicle based on the selected route includes executing a lane change from a first traffic lane of a roadway to a second traffic lane of the roadway, wherein the second traffic lane has a higher calculated availability value than the first traffic lane.

12. A computing unit configured to route plan for an autonomously controllable vehicle, the computing unit configured to:

execute for predicting availability of a feature-based localization of the vehicle on each of a plurality of possible routes of the vehicle between a predetermined starting point and a predetermined end point, wherein at least one possible route of the plurality of possible routes includes at least one roadway having two or more traffic lanes with a shared direction of travel:

receive map data from a feature map of a road traffic network, wherein the feature map includes feature information of a plurality of features of a plurality of roadways that can be used by the vehicle, and wherein the features are configured to be detected by the vehicle using the roadways, via sensor data from environmental sensors of the vehicle, and to be used for a localization of the vehicle;

ascertain, based on the feature information from the feature map, features for at least one roadway to be used by the vehicle, wherein the at least one roadway to be used has two or more traffic lanes with a shared direction of travel;

calculate, for each respective traffic lane of the two or more traffic lanes of the at least one roadway to be used, an availability value for the features of the at least one roadway to be used by the vehicle with respect to an availability criterion, wherein the availability value indicates a quantitative measure for a usability of the features for the localization of the vehicle when the vehicle is using a respective traffic lane of the at least one roadway; and output availability information that includes the availability values and relates to the features of the at least one roadway to be used;

select a route of the vehicle with a highest predicted availability of a feature-based localization of the vehicle based on the executed availability prediction; and control the vehicle based on the selected route.

13. A non-transitory computer-readable storage medium on which is stored a computer program including instructions for route planning for an autonomously controllable vehicle, the instructions, when executed by a data processor, causing the data processor to perform the following steps:

executing for predicting availability of a feature-based localization of the vehicle on each of a plurality of possible routes of the vehicle between a predetermined starting point and a predetermined end point, wherein at least one possible route of the plurality of possible routes includes at least one roadway having two or more traffic lanes with a shared direction of travel:

receiving map data from a feature map of a road traffic network, wherein the feature map includes feature information of a plurality of features of a plurality of roadways that can be used by the vehicle, and wherein the features are configured to be detected by the vehicle using the roadways, via sensor data from environmental sensors of the vehicle, and to be used for a localization of the vehicle;

ascertaining, based on the feature information from the feature map, features for at least one roadway to be used by the vehicle, wherein the at least one roadway to be used has two or more traffic lanes with a shared direction of travel;

calculating, for each respective traffic lane of the two or more traffic lanes of the at least one roadway to be used, an availability value for the features of the at least one roadway to be used by the vehicle with respect to an availability criterion, wherein the availability value indicates a quantitative measure for a usability of the features for the localization of the vehicle when the vehicle is using a respective traffic lane of the at least one roadway; and outputting availability information that includes the availability values and relates to the features of the at least one roadway to be used;

selecting a route of the vehicle with a highest predicted availability of a feature-based localization of the vehicle based on the executed availability prediction; and controlling the vehicle based on the selected route.

* * * * *